April 25, 1944. J. W. SCHLEGEL ET AL 2,347,288
SUGAR GRANULE MANUFACTURE
Original Filed Nov. 8, 1937  2 Sheets-Sheet 1
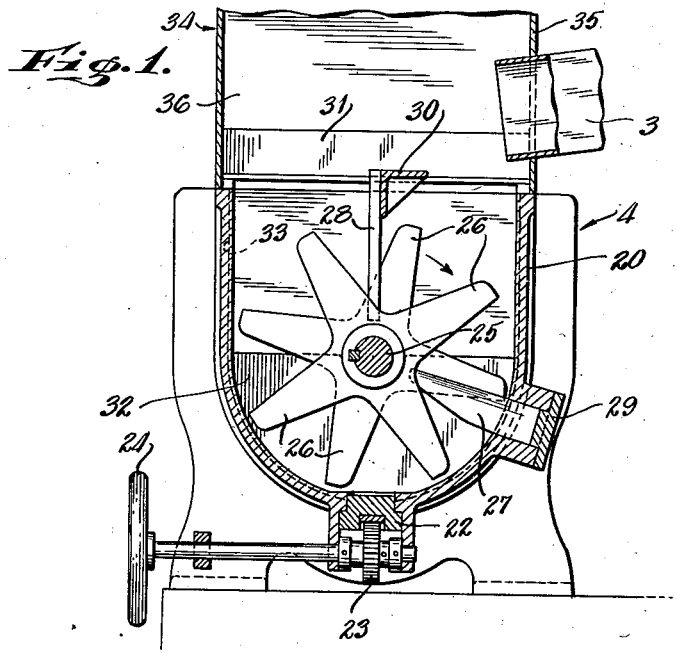
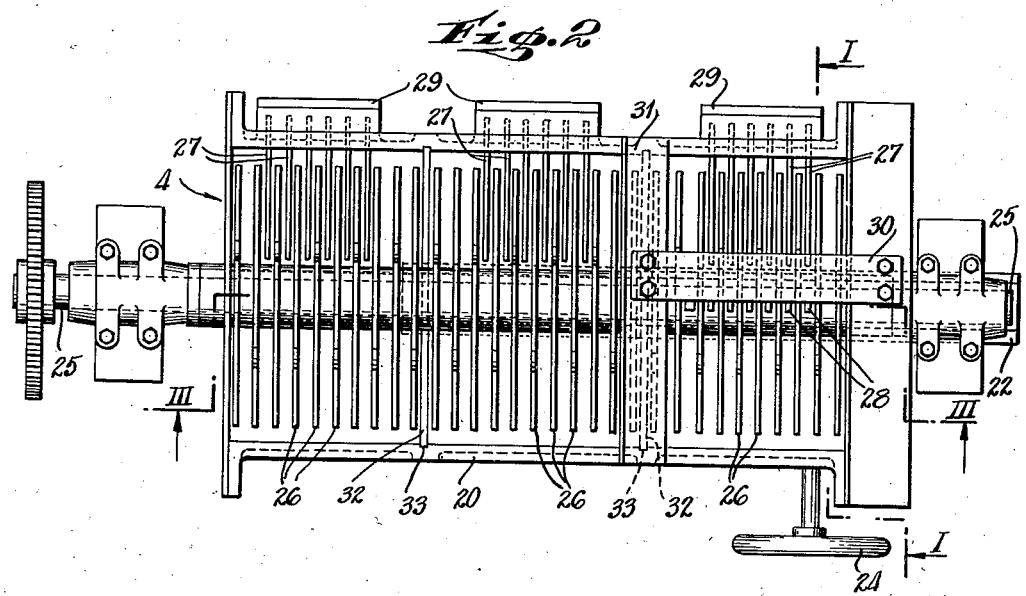

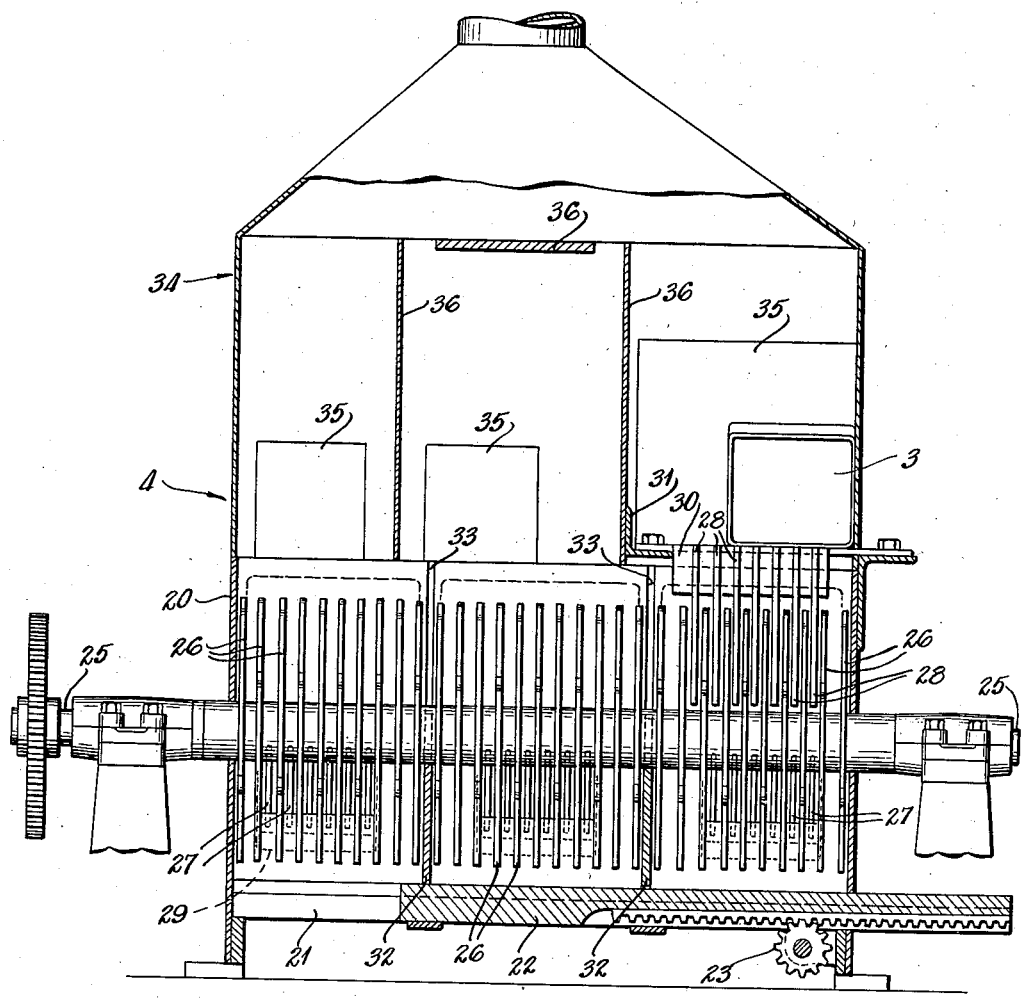

Patented Apr. 25, 1944

2,347,288

UNITED STATES PATENT OFFICE 2,347,288

SUGAR GRANULE MANUFACTURE

John W. Schlegel and Louis Lang, New York, N. Y., assignors to The National Sugar Refining Company, Edgewater, N. J., a corporation of New Jersey Original application November 8, 1937, Serial No. 173,330. Divided and this application May 20, 1940, Serial No. 336,167

10 Claims. (Cl. 127—15)

The invention relates particularly to the manufacture of a granular sugar product of the kind in which each granule is composed of compacted sugar crystals and non-crystallizable materials retained from the original raw syrup or purposely introduced therein, but so incorporated in the mass of each granule as to produce a non-sticky free-flowing product suitable for sprinkling on food if desired and capable of storage for long periods without objectionable caking or solidifying.

As will presently appear, the invention may be used also in other relations than the manufacture of the particular kind of sugar referred to and to the extent the invention is applicable thereto, such related or cognate uses are not disclaimed.

This patent is a division of our prior application Ser. No. 173,330 filed November 8, 1937, and refers particularly to the granule-forming machine therein disclosed.

In the drawings, Fig. 1 is a vertical cross-section of such machine on line I—I of Fig. 2;

Fig. 2, a top plan; and

Fig. 3, a longitudinal vertical section of Fig. 2 on line III—III.

Referring first to Fig. 1, the raw sugar syrup which may be understood to retain a certain percentage of the non-crystallizable component of the raw sugar, and in quantity sufficient to impart its characteristic flavor and color to the product, is delivered by feed trough 3 into the granule-forming machine 4, its temperature then being preferably between 275° F. and 290° F. and its water content in the order of, say, 4%.

Immediately on entering the granule-former, the thick syrup begins to crystallize, promptly becoming a stiff and stiffening paste which, by the progressing cutting and rubbing effect of the machine, presently described in detail, is gradually and rather quickly transformed into a mass resembling fine gravel, of which the maximum granule size is determined by the design of the machine and is subject to control, but in the case in hand runs approximately 3 mm. to 4 mm. in diameter. A certain portion of powder or fines is also produced at the dry end of this machine. From this machine, the still hot granular mass is delivered onto a suitable conveyor by which it is carried onto the dryer and cooler, separator, etc. not shown in the drawings.

The granule-former 4, as shown, is structurally similar to machines already in use for the manufacture of a certain kind of powdered sugar, sometimes called "transformed sugar," but differs therefrom in certain important particulars. It comprises a round-bottomed trough 20 through which the sugar passes while being converted from paste to gravel form. The direction of movement is from right to left in the figure. The trough has a longitudinal outlet slot 21 in its bottom normally occupied by a sliding gate 22. This gate is provided with a rack and pinion 23 and hand-wheel 24, by which it can be moved back and forth in the slot, thus varying the effective position of the slot outlet from the trough.

The trough houses a longitudinal rotary blade-shaft 25 appropriately journalled and carrying many working elements in the form of blades or fingers 26, which pass through the inter-spaces of a complementary series of fixed working elements or fingers as the shaft rotates. Some of these fixed fingers, marked 27, are mounted in the lower part of the trough and some of them, marked 28, are mounted on the upper part of the trough, but all reach close to the shaft as indicated so that the paste must pass between them. The lower fixed fingers 27 are conveniently formed on, or fixed in, a back plate 29 (Fig. 1) bolted into a socket in the trough side wall. The other fixed fingers 28 are carried on a beam 30, bolted at one end on the trough end wall or a part appurtenant thereto, and at the other end to an angle-bar cross-brace 31. The shaft-borne fingers are shown as four-armed discs. They are flat and parallel to each other, i. e. without pitch, and the sides of the fixed fingers are also flat and parallel to the rotary fingers. The clearance between the rotary fingers and the lower fixed fingers 27 is approximately five-sixteenths of an inch, and the clearance between the rotary fingers and the upper fixed fingers 28 is smaller, being about five-thirty-seconds of an inch, which latter dimension, in a general way, serves to control the average size of the granule produced, which is to say that the minimum spacing (five-thirty-seconds) is not substantially greater than the maximum diameter desired for the granules of the product. This close spacing and relation of the clearances to the character of the product is also new in this class of machinery as is also the use of the upper set of fixed fingers, depending into the trough, and working at smaller clearance. The shaft is rotated in practice at about 325 R. P. M.

As a means of retarding the movement of the material through the trough, one or more cross-plates, acting as dams and marked 32, may be removably held in grooves 33 provided in the trough side walls. For removing the liberated steam, the whole trough is covered with a hood 34 connected at its top to an appropriate suction off-take. Access doors indicated at 35 are provided in the hood walls and baffles 36 are mounted in its interior. The syrup trough 3 passes through the hood wall to deliver the hot syrup into the rotating fingers and air also enters the hood at this point to aid in removing the steam which is liberated abundantly from the crystallizing sugar.

The thick syrup starts to crystallize almost instantly on its arrival in the trough, becoming a thick paste which is worked by the blade elements with a cutting and, more especially, a rubbing or rolling action, which automatically divides the mass into small pill-like bodies or granules as it is slowly worked along the trough toward the discharge outlet. Each granule is composed of many fine sucrose crystals compacted together by the action of the blades.

The pill-like condition is more or less critical and it is important that the rubbing action cease as soon as it occurs, which is to say, at that point along the trough where such condition has been attained in a maximum degree and where further working would serve only to increase the production of fines or powder by the attrition effect of the blades on the granules and of the granules on each other. The function of the adjustable outlet is to accommodate the machine to this condition which may obtain earlier or later, depending upon the amount of water in the syrup, the amount of melassegenic material therein, and the temperature. By proper adjustment, by far the larger part of the entering stock, estimated at about 70%, is converted by this machine into product-sized granules, in the range above given, thereby putting but a relatively small burden on the classifying part of the system.

We claim:

1. A granule-forming machine comprising a trough, a rotary shaft therein bearing working elements, a series of trough-borne working elements extending into the interspaces of the shaft-borne elements, and a second series of trough-borne elements extending into said interspaces but having a less clearance therein than the fixed series, and such less clearance being not substantially greater than the maximum granule diameter of the product.

2. A granule-forming machine comprising a trough, a rotary shaft therein, a series of working elements on the shaft, two series of trough-borne working elements extending into the interspaces of the shaft-borne elements, one of said trough-borne series having clearances from that of the shaft-borne elements not substantially greater than the maximum granule diameter of the product.

3. A granule-making machine comprising a trough, a series of driven working elements therein and a series of fixed working elements therein extending into the interspaces of said driven elements, the clearance between said elements being not substantially greater than the maximum diameter of the product granules, means for feeding syrup to one end of the trough, a longitudinal granule outlet slot in the bottom of said trough and a longitudinally movable gate for said slot adapted for varying the length of the path from said feeding means to the point of granule discharge through said slot.

4. A machine for converting hot sugar syrup to granule form comprising a trough with trough-borne fingers and a rotary shaft with shaft-borne fingers working in the interspaces of the other fingers and having clearances therefrom not substantially greater than the diameter of the product granules, said trough having a normally open delivery outlet located at that distance from its sugar-receiving end where the sugar mass has become substantially completely worked to the condition of crystal agglomerates as distinguished from powder or fines.

5. A machine for converting hot sugar syrup to granule form comprising a trough with trough-borne fingers and a rotary shaft with shaft-borne fingers working in the interspaces of the other fingers, the finger clearance between some of said fingers being not substantially greater than the diameter of the product granules, said trough having a normally open delivery outlet located at that distance from its sugar-receiving end where the sugar mass has become substantially completely worked to the condition of crystal agglomerates, and means for varying the length of said distance by short amounts.

6. A machine of the kind described, comprising a trough containing a rotary shaft, a series of flat working elements on the shaft and a series of fixed flat working elements extending into the interspaces of the shaft-borne elements, some of said fixed elements having less clearance from the shaft-borne elements than the others of said fixed elements, and the smallest clearance being not substantially greater than the diameter of the product granule.

7. A machine for converting hot crystallizable syrup to granule form comprising a trough with two series of trough-borne fingers and a rotary shaft with flat shaft-borne fingers without pitch working in the interspaces of the other fingers and having a greater clearance from the fingers of one of said series than from the fingers of the other series, the lesser clearance being not substantially greater than the diameter of the product granules, said trough having a product delivery outlet located at that distance from its syrup-receiving end where the mass has become substantially completely worked to the condition of crystal agglomerates as distinguished from powder or fines.

8. A machine for converting hot crystallizable syrup to granule form comprising a trough with a series of trough-borne fingers, means for delivering the syrup to one end of the trough, a rotary shaft with a series of shaft-borne fingers working in the interspaces of the other fingers, said series of trough-borne fingers being co-extensive with the series of shaft-borne fingers, and a second series of trough-borne fingers co-acting with the shaft-borne fingers only at the syrup-receiving end of the trough, the clearance of the shaft-borne fingers from one of the series of trough-borne fingers at said receiving end being not substantially greater than the diameter of the product granules.

9. A machine for converting hot crystallizable syrup to granule form comprising a trough with trough-borne fingers and a rotary shaft with shaft-borne fingers working in the interspaces of the other fingers, and having clearance from said fingers, not substantially greater than the diameter of the product granule, said trough having a product delivery outlet located at that distance from its syrup-receiving end where the mass has become substantially completely worked to the condition of crystal agglomerates, means for varying the length of said distance by short amounts, and one or more cross-plates acting as dams to the progress of the sugar along said trough.

10. A machine for converting hot sugar syrup to granule form comprising a trough with trough-borne fingers and a rotary shaft with shaft-borne fingers working in the interspaces of the other fingers and having clearances therefrom not substantially greater than the diameter of the product granules, said trough having a cross plate acting as a dam adjacent these interfitting fingers and having a normally open delivery outlet located beyond the dam and at that distance from the sugar receiving end of the trough where the sugar mass has become substantially completely worked to the condition of crystal agglomerates as distinguished from powder or fines.

JOHN W. SCHLEGEL.
LOUIS LANG.